(12) United States Patent
Beckers et al.

(10) Patent No.: US 7,078,830 B2
(45) Date of Patent: Jul. 18, 2006

(54) CONNECTING CIRCUIT AND METHOD FOR CONNECTING A GENERATOR TO THE ELECTRICITY GRID MAKING USE THEREOF

(75) Inventors: Gerardus Jacobus Josephine Beckers, St. Maarten (NL); Dirk Lucas Bekkering, Zevenaar (NL); Willem Antoon Van Kampen, Echteld (NL); Berend Jan Van Kampen, Leiden (NL); Johannes Sjoerd Ribberdink, Koedijk (NL); Jacobus Gerardus Maria Zutt, Sint Maartensvlotbrug (NL)

(73) Assignee: Enatac Micro-Cogen B.V., Lichtenvoorde (NL)

( * ) Notice: Subject to any disclaimer, the term of this patent is extended or adjusted under 35 U.S.C. 154(b) by 77 days.

(21) Appl. No.: 10/471,708

(22) PCT Filed: Mar. 12, 2002

(86) PCT No.: PCT/NL02/00166

§ 371 (c)(1),
(2), (4) Date: Mar. 11, 2004

(87) PCT Pub. No.: WO02/073768

PCT Pub. Date: Sep. 19, 2002

(65) Prior Publication Data

US 2004/0130216 A1 Jul. 8, 2004

(30) Foreign Application Priority Data

Mar. 12, 2001 (NL) .................................... 1017585

(51) Int. Cl.
*H02J 3/24* (2006.01)
*H02P 9/00* (2006.01)

(52) U.S. Cl. ............................ 307/85; 322/20; 307/78; 307/77; 307/64

(58) Field of Classification Search .................. 307/66, 307/85, 80, 84, 78; 322/20
See application file for complete search history.

(56) References Cited

U.S. PATENT DOCUMENTS

| 5,686,768 | A  | * | 11/1997 | Thomsen et al. ............. 307/64 |
| 5,895,981 | A  | * | 4/1999  | Flegel ......................... 307/64 |
| 6,184,593 | B1 | * | 2/2001  | Jungreis ...................... 307/64 |
| 6,198,176 | B1 | * | 3/2001  | Gillette ........................ 307/64 |
| 6,316,918 | B1 | * | 11/2001 | Underwood et al. .......... 322/20 |
| 6,465,913 | B1 | * | 10/2002 | Nagai et al. .................. 307/85 |
| 6,768,223 | B1 | * | 7/2004  | Powell et al. ................. 307/64 |

FOREIGN PATENT DOCUMENTS

| EP | 0 869 599 A2 | 10/1998 |
| NL | 8202757 | 2/1984 |

* cited by examiner

*Primary Examiner*—Lynn Feild
*Assistant Examiner*—Michael Rutland-Wallis
(74) *Attorney, Agent, or Firm*—Christensen O'Connor Johnson Kindness PLLC

(57) ABSTRACT

The present invention relates to a connecting circuit for connecting to an electricity grid an electric generator for generating electrical energy, comprising a measuring circuit for measuring the current through the connecting circuit; a storage element for storing charge supplied by the generator for at least some period of time; a second measuring circuit for measuring the amount of stored charge, which circuit is connected to a storage element; and a first controllable switch for connecting the generator to the electricity grid subject to the measured current intensity and measured stored charge.

20 Claims, 4 Drawing Sheets

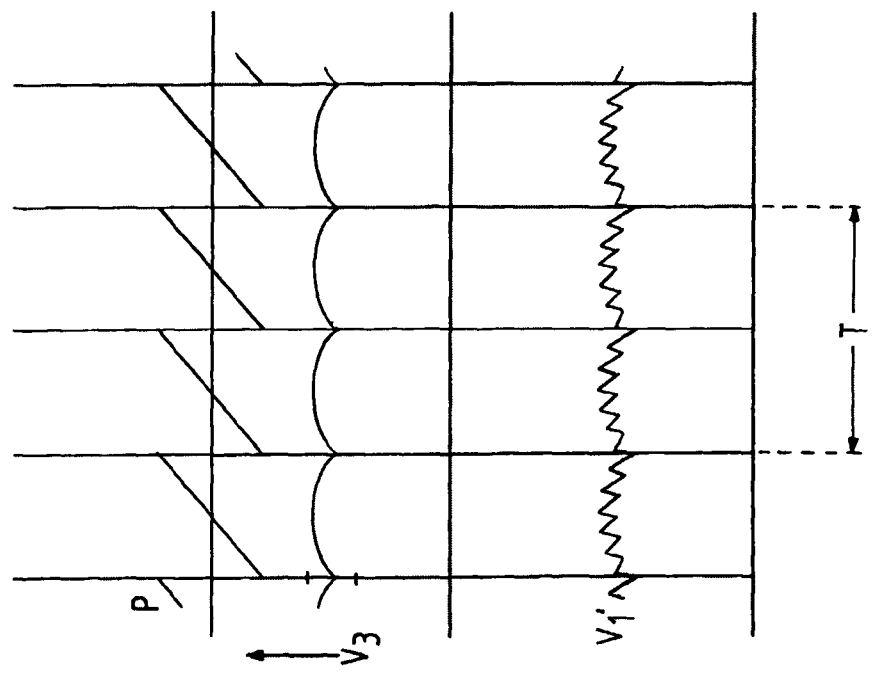
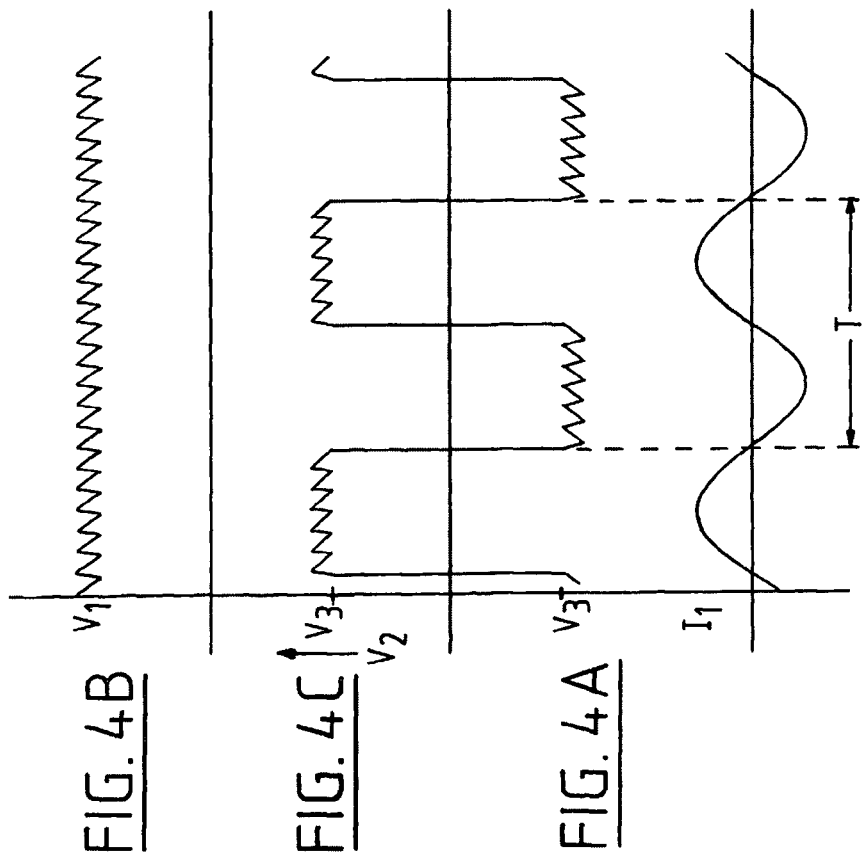
FIG.5B
FIG.5A
FIG.5C
FIG.4B
FIG.4C
FIG.4A

CONNECTING CIRCUIT AND METHOD FOR CONNECTING A GENERATOR TO THE ELECTRICITY GRID MAKING USE THEREOF

As a result of the liberalization of electricity supply, wherein it has also become possible to supply electricity to the electricity grid, local generation of electricity, i.e. in homes or other buildings where for instance a heating installation is also present, becomes efficient. An example of such a coupling is described in the non-prepublished Netherlands patent application 1015319, a copy of which is enclosed and the content of which should be deemed as incorporated by reference herein.

In the central generation of electricity a synchronous generator is connected to the electricity grid by varying the rotation speed of the generator until the phase difference between the generator and the voltage of the electricity grid is sufficiently small. This procedure will generally not suffice at local level, and certainly not in the above described combination wherein a Stirling generator is applied as (linear) generator.

If the electric generator is connected to the electricity grid when phase and frequency differ considerably from each other, a large current will begin to flow, which is either not permissible in the electricity grid or which will cause damage to the (Stirling) generator within a short time.

The present invention has the object of enabling a reliable connection of generator and electricity grid with relatively simple means and of obviating the above stated problems.

The present invention provides a connecting circuit for connecting to an electricity grid an electric generator for generating electrical energy, comprising:
 a measuring circuit for measuring the current through the connecting circuit;
 a storage element for storing charge supplied by the generator for at least some period of time;
 a second measuring circuit for measuring the amount of stored charge, which circuit is connected to a storage element; and
 a first controllable switch for connecting the generator to the electricity grid subject to the measured current intensity, voltage and stored charge.

During synchronization an electric load on the generator will be present which acts in damping manner. In the case of a Stirling generator the mechanical amplitude of the generator will be limited and mechanical damage avoided; in the case of a rotating electric generator excessive angular velocity of the generator is avoided. As soon as phase-locking has taken place it will continue to be maintained within certain limits.

Preferably arranged parallel to the storage element is a dissipative element and a second controllable switch which is closed as long as the generator is not coupled to the grid, and whereby rapid synchronization can take place using a storage element with relatively small capacitance (order of magnitude: μF).

Further advantages, features and details of the present invention will be elucidated on the basis of the following description of a preferred embodiment of a circuit and method according to the present invention with reference to the annexed drawings, in which:

FIGS. 4A–4C show respectively graphs of signals occurring in the circuit diagram of FIGS. 1–3;

FIGS. 5A–5C show respectively graphs of signals occurring in the circuit diagram of FIGS. 1–3.

Figure 1:
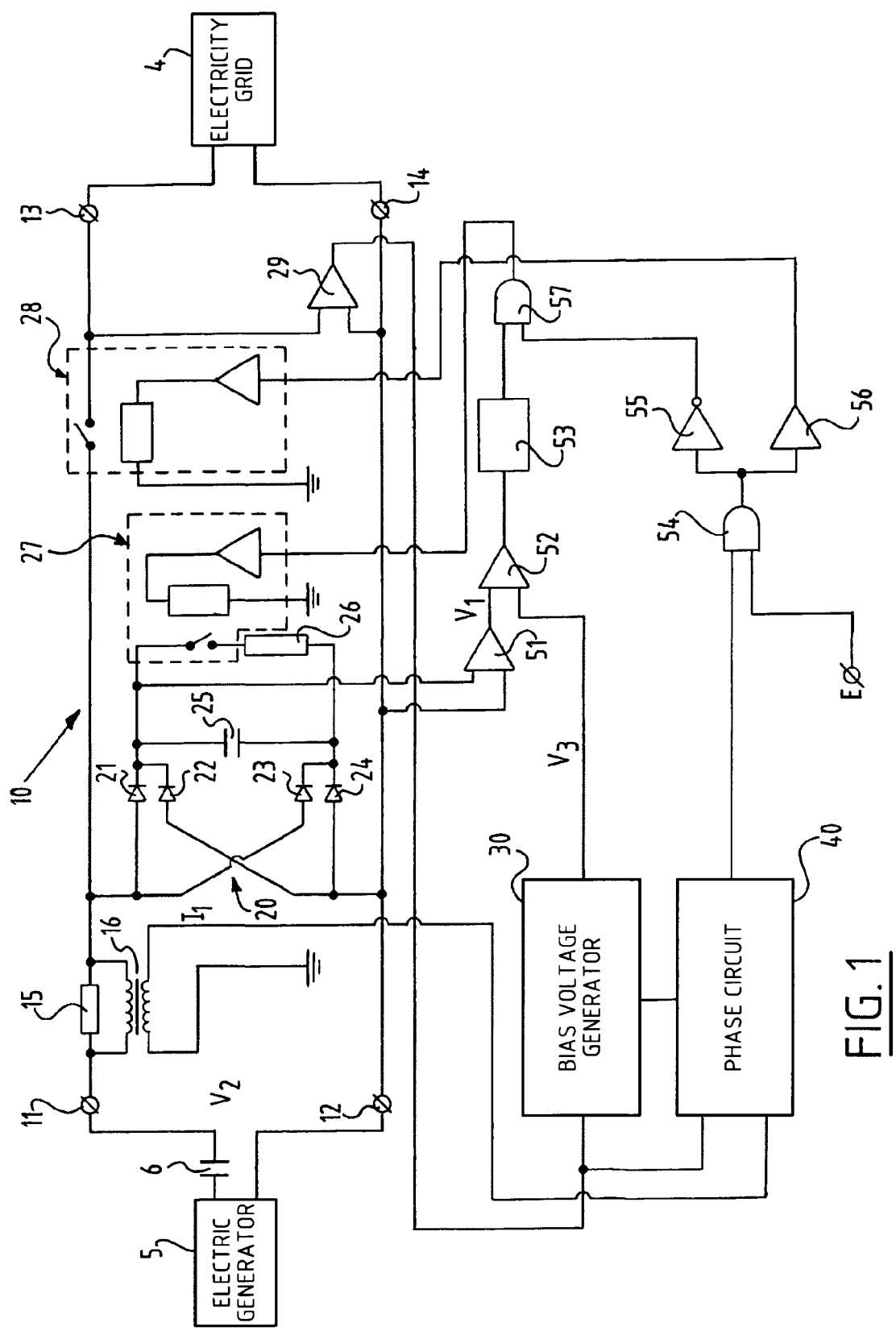
FIG. 1 shows a diagram of a first preferred embodiment of a circuit according to the present invention.

A preferred embodiment of a circuit 10 according to the present invention is connected between terminals 11 and 12 of an electric Stirling generator 5 (for instance 350–5000 W power at 230 V and 50 Hz, respectively 110 V and 60 Hz) with matching capacitor 6 for the purpose of providing the correct match for resistance load, for instance a power factor of about 0.9–1.0, and terminals 13 and 14 of a schematically shown electricity grid 4. A first, schematically shown controllable switch 28 is further arranged between terminals 11 and 13. Circuit 10 comprises a shunt resistance 15 so that the current generated by the generator can be measured via a transformer 16. Circuit 10 further comprises a diode bridge circuit 20 comprising four diodes 21, 22, 23 and 24, the outputs of which are connected to the poles of a storage capacitor 25. Connected in parallel to storage capacitor 25 is a resistance 26 as well as a schematically shown second controllable switch 27. A differential amplifier 29 is also connected between terminals 13 and 14.

The output of differential amplifier 29 is connected to the input of a circuit 30 for generating a bias voltage of a predetermined value. The output of differential amplifier 29 is likewise connected to the input of a phase circuit 40 for determining and shifting the phase to which the output of transformer 16 is also connected. Connected to the poles of capacitor 25 is a differential amplifier 51, to the outputs of which is connected a second differential amplifier 52 which has as other input the output of circuit 30. A Schmitt trigger circuit 53 is connected to the output of differential amplifier 52. Connected to the output of phase circuit 40 is an AND-gate 54, the other input of which is formed by a "Logic Enable Signal" E. Amplifiers 55 (with invertor) and 56 are connected to the output of AND-gate 54. The output of amplifier 56 is connected to the input of the controllable switch 27. The inverting output of amplifier 55 is connected to an AND-gate 57, the output of which is connected to controllable switch 28.

Figure 2:
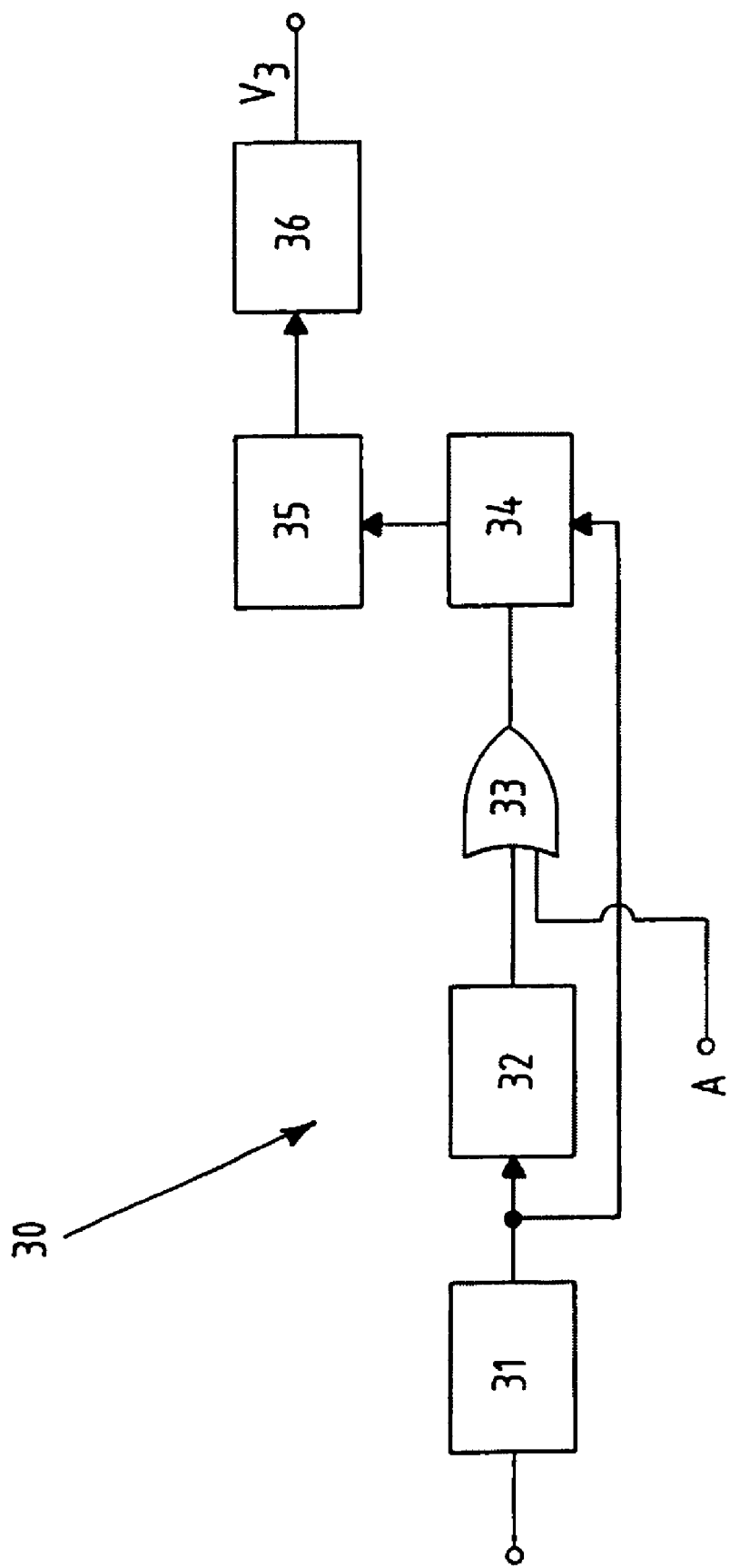
FIG. 2 shows a preferred embodiment of a part of the circuit diagram of FIG. 1.

Circuit 30 (FIG. 2) comprises a converter 31 for converting the output signal from differential amplifier 29 into a block-shaped signal, a frequency multiplier 32 which is connected to the output of converter 31 and to the second input of which is connected a signal A from phase circuit 40. A counter 34 is further connected to the output of the OR-gate 33, while the reset input is connected to the output of converter 31. Circuit 30 also comprises an EPROM 35 connected to eight parallel outputs (D0–D7) of counter 34. A DA-converter 36 is connected to the eight parallel outputs of EPROM 35.

Figure 3:
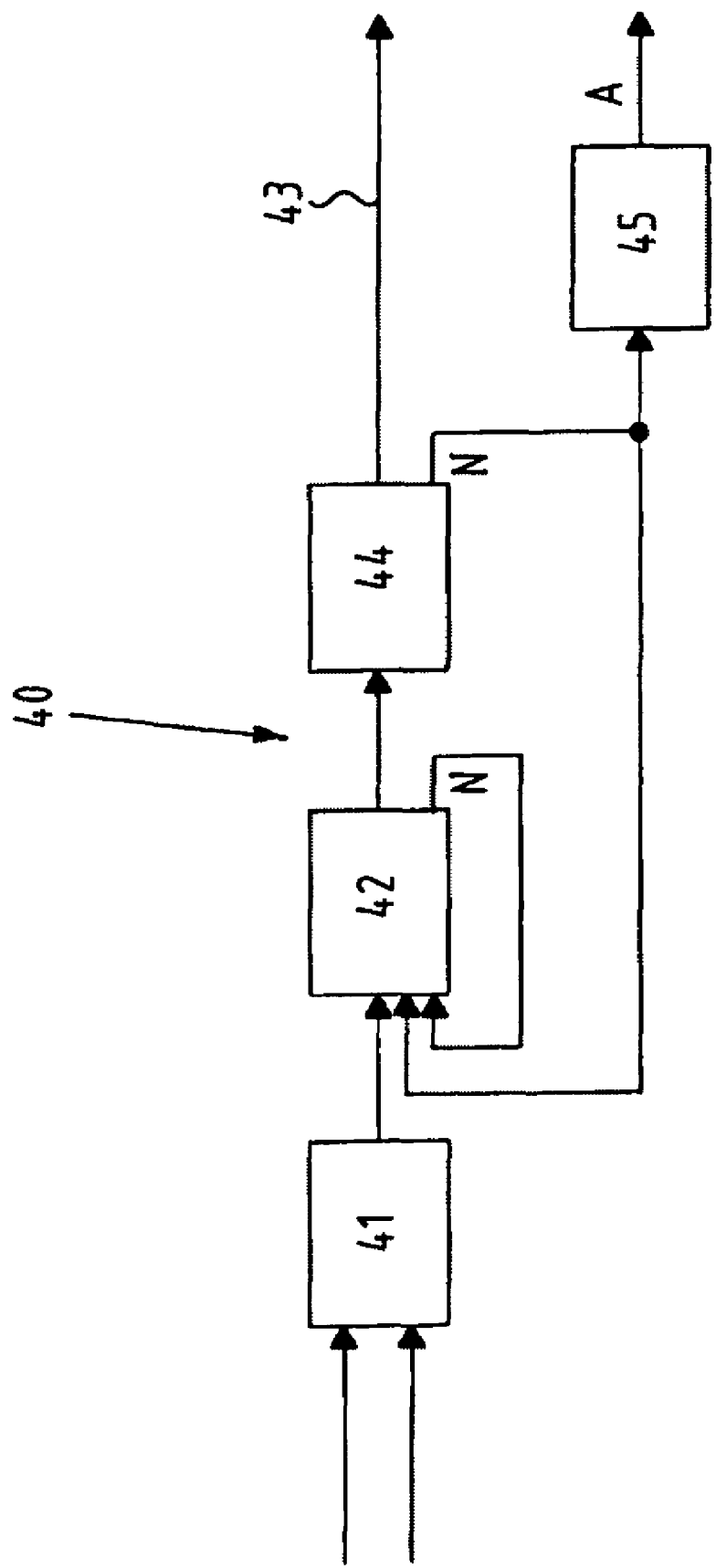
FIG. 3 shows a preferred embodiment of another part of the circuit diagram of FIG. 1.

A preferred embodiment of a phase circuit 40 (FIG. 3) comprises a phase comparator 41 for comparing the phase of the two inputs, i.e. the current from terminals 11 on the one hand and the voltage between terminals 13 and 14 on the other. The phase difference is sent to a schematically shown microprocessor 42–44 in which a return loop is active as long as the phase difference does not equal zero. When the phase difference is (roughly) equal to zero, a logic signal is generated to the AND-gate 54 (FIG. 1). The logic signal A is generated via a pulse generator 45 to circuit 30 as long as the phase difference as designated schematically in block 44 does not equal zero.

In another embodiment of circuits 30 and 40 the functions of these circuits are wholly or partially implemented in a microprocessor or a digital signal processor, with a view to being able, among other things, to intervene in the case of exceptional operating conditions, this being possible because, using the output signal from AND-gate 54, it is possible within a time which is short compared to the period time of the grid, for instance within 0.2 millisecond, to switch from grid coupling to the load formed by capacitor 25 and the variable load in which resistance 26 is included.

The operation of the above stated circuit will be further explained on the basis of the graphs of FIGS. 4A–5C.

The circuit according to the present invention was tested with a Stirling generator for 350 W at 110 V and 60 Hz such as manufactured by the company STC of the USA. The circuit can however be used for all types of synchronous, linear or rotating electric generators. In such generators phase-locking will be maintained as long as the phase variation between machine and electricity grid is small enough.

At switch-on, i.e. connection of generator 5 to electricity grid 4 via switch 28, frequency and phase must be sufficiently equal to avoid too large a current beginning to flow, which is either not permissible in electricity grid 4 or which will cause damage to generator 5.

Stirling generator 5 produces a substantially sine-shaped current if it is connected to a resistance load. The current $I_1$ measured using transformer 16 is shown in FIG. 4A. The current rectified by means of diode circuit 20 charges capacitor 25. The voltage $V_1$ which would result therefrom at the output of differential amplifier 51 is shown in FIG. 4B. The voltage $V_1$ is compared in differential amplifier 52 with the output of circuit 30.

Switch 27 is controlled by the output of AND-gate 57 which is connected to the Schmitt trigger 53. If invertor 55 provides a logical "true" signal, the control loop consisting of components 51, 52, 53, 57 and 27 will be active; at constant bias voltage $V_3$ charge is alternatingly either taken from the capacitor or not, wherein the voltage on the capacitor will display the form as shown in FIG. 4B. The voltage between terminals 11 and 12 will take the form in FIG. 4C. The positive and negative values will be roughly equal in magnitude to the electrical voltage on capacitor 25. In a practical circuit the current through the measuring resistance and the amplitude of the voltage between terminals 11 and 12 respectively have for instance roughly the values as in grid-coupled operation.

FIG. 5A shows a possible wave shape for the voltage $V_3$ to enable synchronization of the generator with the grid.

In the present embodiment voltage $V_3$ has a period which equals half the period of the electricity grid, while the phase is locked with the grid. The value varies for instance between a maximum value $V_{max}$ and a value of 0.8 $V_{max}$ with half the period of the average period of the grid.

For $V_3$ the following formula can for instance apply:

$$V_3 = V_{max} - 4 \cdot (V_{max} - 0.8 V_{max}) T^{-2} \circ p^2,$$

wherein T is the period of the electricity grid and $-T/2 \leq P \leq T/2$ applies for the variable P.

An example of the variable P is for instance shown in FIG. 5B, while the resulting voltage $V_1'$ at varying $V_3$ is shown in FIG. 5C.

As long as the bias voltage $V_3$ is constant the generator will idle and no phase-locking will take place. However, when the voltage varies, for instance with a period $T/2$ as shown in FIG. 5A, phase-locking will then occur rapidly.

In circuit 30 (FIG. 2) the signal obtained via differential amplifier 29 from the grid is first converted to a block-shaped signal in converter 31. In multiplier 32 the frequency is multiplied by for instance 128. Counter 34 is reset by the block-shaped signal. Signal A will influence the count of counter 34. The output data lines of counter 34 are connected to EPROM 35 which generates for instance the wave form of FIG. 5A via converter 36.

In circuit 40 (FIG. 3) the phase difference between current $I_1$ and voltage of the grid is measured in 41. As long as the phase difference is not equal to zero a return loop is active. Each time the return loop is completed an additional count A is generated via pulse generator 45 and fed to counter 34 via OR-gate 33, whereby voltage $V_3$ is shifted in phase until the generator is finally synchronized with the electricity grid. At that moment switch 25 can be opened and switch 28 closed. The generator will then supply energy to the grid in phase-locking with the grid.

The invention is not limited to the above described preferred embodiment thereof; the rights sought are rather defined by the following claims, within the scope of which many modifications can be envisaged.

The invention claimed is:

1. A connecting circuit for connecting to an electricity grid an electric generator generating electrical energy, comprising:
   (a) a current measuring circuit for measuring the current through the connecting circuit;
   (b) a storage element for storing charge supplied by the generator for at least some period of time;
   (c) a charge measuring circuit for measuring the amount of stored charge, which circuit is connected to the storage element;
   (d) a first controllable switch having an open position for disconnecting the electric generator from the electricity grid and a closed position for connecting the electric generator to the electricity grid in accordance with measured current intensity and measured stored charge;
   (e) a dissipative element; and
   (f) a second controllable switch connected in parallel with the storage element;
   wherein:
   (i) mutual synchronization of the phase of the current generated by the electric generator in the connecting circuit and the phase of the voltage of the electricity grid is created by:
      (1) the storing of charge supplied by the electric generator in the storage element when the second switch is in the open position; or
      (2) dissipating charge from the storage element via the dissipative element when the second switch is in the closed position; and
   (ii) mutual synchronization of the phase of the current generated by the electric generator in the connecting circuit and the phase of the voltage of the electricity grid causes the first switch to close and the second switch to open and exceptional operating conditions in the electricity grid cause the first switch to open and the second switch to close.

2. The connecting circuit claimed in claim 1, wherein the current measuring circuit comprises a transformer.

3. The connecting circuit claimed in claim 1 or 2, wherein the charge measuring circuit comprises a differential amplifier.

4. The connecting circuit claimed in claim 1, further comprising a circuit for generating a voltage of a predetermined value.

5. The connecting circuit claimed in claim 1, further comprising a phase circuit for determining and shifting the phase of the measured signals.

6. The connecting circuit claimed in claim 4, wherein the circuit for generating a voltage of a predetermined value comprises a microprocessor, an EPROM in which the signal of predetermined value is stored in digital form, and a DA-converter.

7. The connecting circuit claimed in claim 6, including a counter connected to the EPROM for phase-shifting of the output of the EPROM.

8. The connecting circuit claimed in claim 5, wherein the phase circuit comprises a phase comparator, a phase-locking and a return loop.

9. A connecting circuit for connecting an electric generator generating electrical energy to an electricity grid comprising:
(a) a current measuring circuit for measuring current flow through the connecting circuit;
(b) a storage element for storing charge supplied by the electric generator;
(c) a charge measuring circuit for measuring the charge stored by the storage element;
(d) a first controllable switch for connecting the electric generator to and disconnecting the electric generator from the electricity grid;
(e) a charge dissipative element;
(f) a second controllable switch for connecting the charge dissipative element in parallel with and disconnecting the charge dissipative element from the storage element; and
(g) a control system for receiving signals representing the current measured by current measuring circuit and the charge measured by the charge measuring circuit and controlling the first and second controllable switches such that mutual synchronization between the phase of the current generated by the electric generator in the connecting circuit and the phase of the voltage of the electricity grid is controlled by controlling the charge supplied to the storage element by the electric generator, mutual synchronization causing the first controllable switch to connect the electric generator to the electricity grid and the second controllable switch to disconnect the charge dissipative element from the storage element and exceptional operating conditions in the electricity grid causing the first controllable switch to disconnect the electric generator from the electricity grid and the second controllable switch to connect the charge dissipative element in parallel with the storage element.

10. The connecting circuit claimed in claim 9, wherein the current measuring circuit includes a transformer.

11. The connecting circuit claimed in claim 9 or 10, wherein the current measuring circuit includes a differential amplifier.

12. The connecting circuit claimed in claim 9, wherein the control system includes a circuit for generating a voltage of a predetermined value.

13. The connecting circuit claimed in claim 12, wherein the circuit for generating a voltage of a predetermined value includes a microprocessor, an EPROM in which the signal of predetermined value is stored in digital form, and a DA-converter.

14. The connecting circuit claimed in claim 13, including a counter connected to the EPROM for phase-shifting of the output of the EPROM.

15. The connecting circuit claimed in claim 9, wherein the control system includes a phase circuit for determining and shifting the phase of the measured signals.

16. The connecting circuit claimed in claim 15, wherein the phase circuit comprises a phase comparator, a phase-locking and a return loop.

17. A method of connecting an electric generator generating electrical energy to an electricity grid comprising:
(a) measuring the current flow through a connecting circuit connecting the electric generator to the electricity grid;
(b) storing a charge supplied by the electric generator;
(c) measuring the stored charge;
(d) controlling the connecting circuit and the stored charge such that mutual synchronization between the phase of the current generated by the electric generator in the connecting circuit and the phase of the voltage of the electricity grid is controlled by controlling the stored charge supplied by the electric generator, mutual synchronization causing the connecting circuit to connect the electric generator to the electricity grid and maintain the stored charge and exceptional operating conditions in the electrical grid causing the connecting circuit to disconnect the electric generator from the electric grid and dissipate the stored charge.

18. The method claimed in claim 17, wherein measuring current flow through a connecting circuit includes transforming the current flow.

19. The method claimed in claim 17, wherein controlling the connecting circuit and the stored charge includes generating a voltage of a predetermined value.

20. The method claimed in claim 17, wherein controlling the connecting circuit and the stored charge includes determining and shifting the phase of the measured signals.

* * * * *

UNITED STATES PATENT AND TRADEMARK OFFICE
CERTIFICATE OF CORRECTION

PATENT NO. : 7,078,830 B2
APPLICATION NO. : 10/471708
DATED : July 18, 2006
INVENTOR(S) : G.J.J. Beckers et al.

It is certified that error appears in the above-identified patent and that said Letters Patent is hereby corrected as shown below:

| COLUMN | LINE | ERROR |
|---|---|---|
| Title Page (57) Col. 2 | Abstract 10 of text | "intensity-and" should read --intensity and-- |
| 5 (Claim 9, | 30 line 19) | "measured by current" should read --measured by the current-- |

Signed and Sealed this

Nineteenth Day of December, 2006

JON W. DUDAS
*Director of the United States Patent and Trademark Office*